INVENTOR.
STUART E. CORRY

United States Patent Office 3,572,217
Patented Mar. 23, 1971

3,572,217
COUPLING DEVICE FOR FLUID PRESSURE TRANSMISSION CONDUITS
Stuart E. Corry, 4511 S. Lewis Place,
Tulsa, Okla. 74105
Filed May 15, 1969, Ser. No. 824,890
Int. Cl. F01b 19/02
U.S. Cl. 92—48                                                  7 Claims

ABSTRACT OF THE DISCLOSURE

In a coupling device for fluid pressure transmission conduits, a first housing member connected to a first conduit and a second housing member connected to a second conduit are releasably joined. Each housing member contains a closed chamber having one end sealed by an impermeable membrane. Pressure in one of the closed chambers is imparted to the other chamber by means of a piston longitudinally slidable within the joined housing members and intermediate and contiguous with the impermeable membranes.

CROSS-REFERENCE

This application is not related to any pending United States or foreign patent applications.

BACKGROUND OF THE INVENTION

This invention relates to a device for the coupling of fluid pressure transmission conduits, such as hydraulic conduits, and more particularly to a device wherein the conduits can be coupled and disjoined without the draining of the fluid within the conduits.

In objects such as machinery and instruments operated by hydraulic principles there are many circumstances when it is necessary to disconnect the conduits such as when the object is to be replaced or moved. Presently such disconnecting is accomplished by shutting the fluid off at the power source, draining the fluid from the conduit, and finally disconnecting the conduit from the machine. Once the machine has been removed and a new one substituted, it is necessary to reconnect the conduit and replace the fluid in the conduit. This method has the disadvantages of being time consuming and costly due to the fact that in the disconnecting process the fluid is usually contaminated and rendered useless. It is an object of this invention to provide a device wherein hydraulic conduits can be disconnected in one step without the necessity of draining the conduit.

SUMMARY OF THE INVENTION

Generally, the invention consists of two hollow housing members each incorporating a closed chamber having one end sealed by an impermeable membrane. Each chamber communicates with a fluid pressure transmission conduit and is filled with fluid. The housings are joined about a longitudinal axis, the impermeable membranes of the reservoirs being in facing relationship. A piston longitudinally slidable within the connected housing members and intermediate the membranes has opposite ends contiguous with the respective membranes.

Pressure in one of the closed chambers in one of the housing members is imparted by the membrane therein to the piston and by longitudinal movement of the piston the same pressure is imparted by way of the other membrane to the second chamber.

DETAILED DESCRIPTION OF THE PREFERRED EMBODIMENT

In describing the preferred embodiment of this invention specific terminology will be resorted to for the sake of clarity. However, it is to be understood that each specific term used includes all technical equivalents which operate in a similar manner to accomplish a similar purpose.

Figure 1:
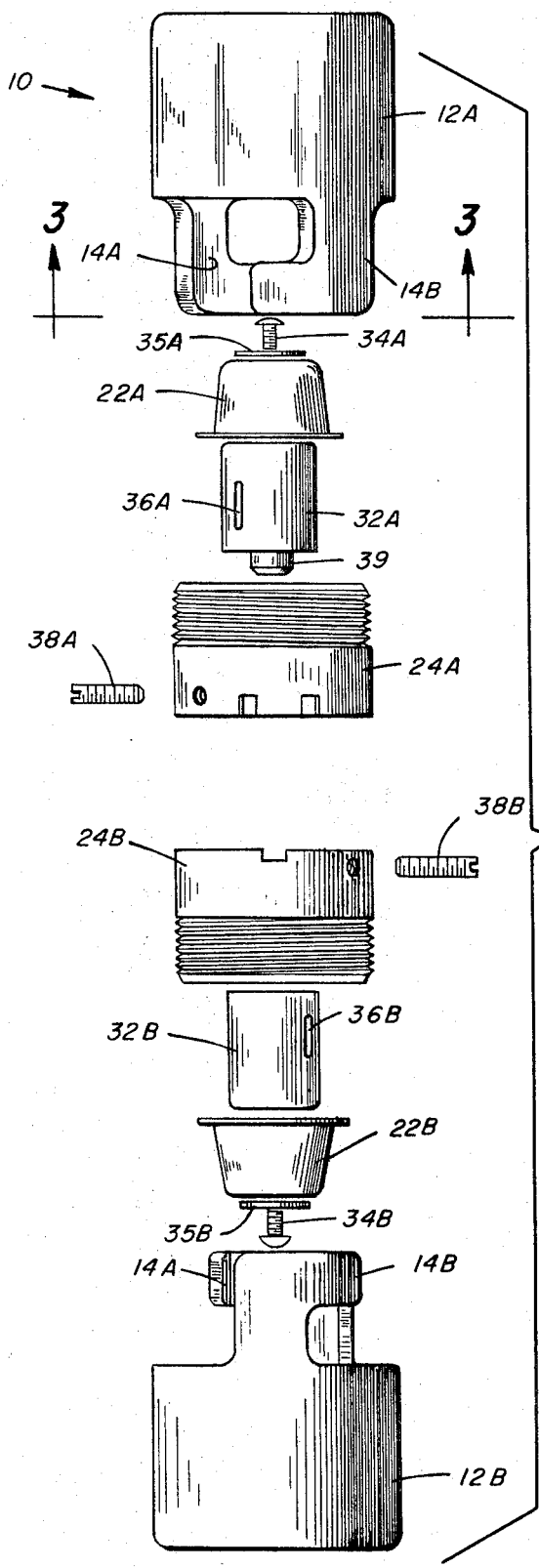
FIG. 1 is an exploded view of the coupling device showing all the parts thereof.
Figure 2:
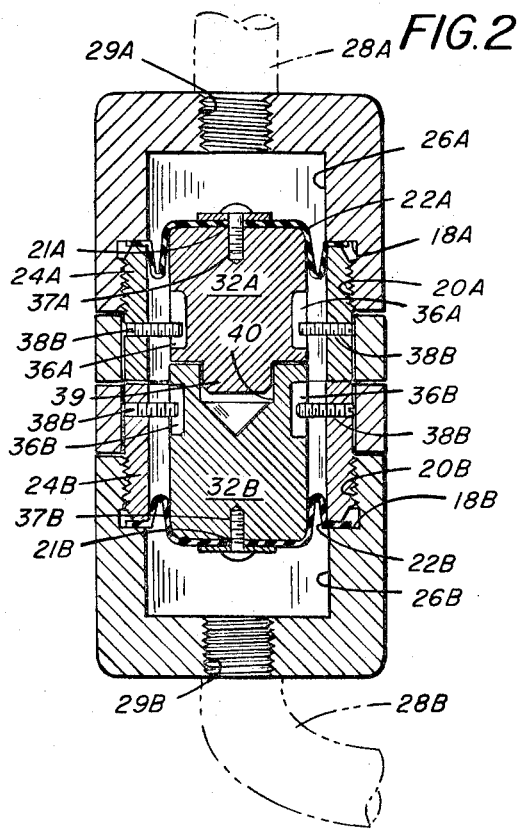
FIG. 2 is an assembled cross-sectional view of the device.
Figure 3:
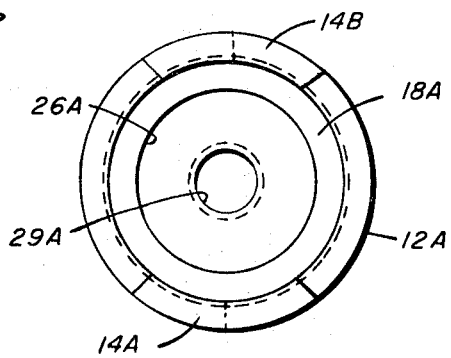
FIG. 3 is a view of the device taken along the line 3—3 of FIG. 1.

Referring now to FIG. 1, a coupling device, generally indicated by the numeral 10, has two matching hollow cylindrical housing members 12A and 12B each having an opened end and a closed end. Extending vertically from the rim defining the opened end of each of the housing members 12A and 12B are two diametrically opposed inverted L-shaped locking segments 14A and 14B convectionally arcuate about a longitudinal axis passing through the center of the housing members. The horizontal portion of the extension segment 14A, that is, the base of the L, progresses from its vertical portion in a direction opposite the progression of the horizontal portion of 14B from its vertical portion. As can be seen in FIG. 2 and FIG. 3, the opened end of each housing member 12A and 12B is counterbored to form an intercircular shoulder 18A and 18B; the counterbored portion of each of the housing members contains internal threads 20A and 20B.

Impermeable membranes 22A and 22B, each having a transverse aperture 21A and 21B therein, are contiguous with the respective shoulders 18A and 18B and are held in leakproof compression thereto by tubular membrane retaining members 24A and 24B, each having one end threadably received within the respective internal threads 20A and 20B engaging the shoulders 18A and 18B. The membranes 22A and 22B, so positioned, form within each housing member 12A and 12B a closed chamber 26A and 26B which communicates with a pressure transmission conduit 28A and 28B through a fluid port 29A and 29B within the closed end of the respective housing members.

Slidably received within membrane retaining member 24A is a first piston portion 32A having one end rigidly affixed to membrane 22A by a screw 34A which passes through a washer 35A and aperture 21A in membranes 22A and is threadably engaged in a threaded hole 37A therein and having on its opposite end a male extension 39. Slidably received within membrane retaining member 24B is a second piston portion 32B of piston 32 having one end rigidly affixed to membrane 22B a screw 34B which passes through washer 35B and aperture 21B in membrane 22B and is threadably engaged in a threaded hole 37B therein and having within the other end a female borehole 40. Piston portion 32A contains longitudinal slots 36A which slidably receive bolts 36B extending from retainer member 24A. In like manner, piston portion 32B contains longitudinal slots 36B which slidably receive bolts 38B extending from retainer member 24B. Studs 38A and 38B prevent the respective piston portions 32A and 32B from longitudinally sliding from the membrane retaining members 24A and 24B.

In operation, the open ends of the housing members 12A and 12B are placed in abutting relationship and one housing member is given clockwise movement while the other housing member is given counterclockwise movement whereby the locking segments 14A and 14B become interlocked thereby joining the housing members 12A and 12B. As can be seen in FIG. 2, such joining of the housing members lodges the male extension segment 39 of the first piston portion 32A into the female borehole 40 whereby the piston portions 32A and 32B establish communication between the respective membranes 22A and 22B.

Pressure in closed chamber 26A caused by fluid received from conduit 28A through fluid port 29A is imparted to the piston portions 32A and 32B by membrane 22A and by longitudinal movement of the piston portions the same pressure is imparted by way of the membrane 22B to enclosed chamber 26B.

When it is desired that the pressure transmission conduits be separated the coupling device 10 can be disjoined by a simple twisting in opposite directions of the two respective housing members 12A and 12B whereby the locking segments 14A and 14B are released from each other and the housing members 12A and 12B can be separated.

When the housing members 12A and 12B are so separated there is no loss of fluid in the respective reservoirs 26A and 26B since the impermeable membranes 22A and 22B are in leakproof compression with the respective shoulder of the respective housing member 12A and 12B. Thus there is no need for having the piston portions and membrane retaining members 24A and 24B sealed in any manner.

What is claimed:

1. A device for coupling a first pressure transmission conduit to a second pressure transmission conduit comprising:
   a first hollow housing member having an opened end and a closed end, the closed end having a fluid port therein receiving said first pressure transmission conduit.
   a second hollow housing member having an opened end and a closed end, the closed end having a fluid port therein receiving said second pressure transmission conduit, said first and second housing members including means releasably connected about a longitudinal axis to each other, the opened ends of the respective housing members being in facing relationship,
   an impermeable membrane including retaining means sealably positioned in each of said housing members intermediate the length thereof providing in each housing a closed fluid filled chamber having communication with said fluid port, and
   a piston longitudinally slidable within said connected first and second housing members and intermediate and contiguous with said membranes, the pressure in said closed chamber in said housing being imparted by said membrane therein to said piston and by longitudinal movement of said piston the same pressure is imparted by way of said membrane in the other of said housing to the said closed chamber therein.

2. A device for coupling a first pressure transmission conduit to a second pressure transmission conduit according to claim 1 wherein said means releasably connecting said housing members to each other by means comprising:
   diametrically opposed inverted L-shaped integral locking segments projecting longitudinally from said open end of each of said housing members, said locking segments being concavely arcuate about the longitudinal axis of said housing members whereby said housing members can be jointed by placing said open ends of said housing members in abutting relationship and twisting said housing members in opposite direction thereby interlocking said locking segments.

3. A device for coupling a first pressure transmission conduit to a second transmission conduit according to claim 1 wherein said piston is comprised of a first and second portion, each piston portion having a forward and rearward end, one piston portion being slidably positioned in said first housing member and the other piston portion being slidably positioned in said second housing portion, said piston portions being contiguous at their forward ends and in axial alignment when said body members are connected, the rearward end of each engaging a said membrane.

4. A device for coupling a first pressure transmission conduit to a second pressure transmission conduit according to claim 3 wherein said rearward end of each of said piston portions contains an axial threaded hole and wherein each of said membrances has an aperture therein, and including a screw and washer for each piston portion, said screw passing through said washer and said aperture in said membrane and threadably engaging said threaded hole in said piston portion.

5. A device for coupling a first pressure transmission conduit to a second pressure transmission conduit according to claim 3 including means of slidably and removably retaining said piston portions in said housing members.

6. A device for coupling a first pressure transmission conduit to a second pressure transmission conduit according to claim 5 wherein each piston portion has a longitudinal slot in the external surface thereof and wherein said means of slidably and removably retaining said piston portions in said housing members include:
   a removable stud supported internally of each of said housing members, one end of each of said studs being slidably received by said longitudinal slot in one of said piston portions.

7. A device for coupling a first pressure transmission conduit to a second pressure transmission conduit according to claim 1 wherein each of said hollow housing members is defined by an enlarged internal diameter counterbore therein at said open end providing an internal annular shoulder therein intermediate said housing member open end and closed end, said enlarged diameter counterbore being internally threaded, and wherein said membrane retaining means includes a first and second tubular membrane retaining member each having external threads thereon threadably receivable within a said housing member's enlarged diameter internal bore, one end of said membrane retaining member engaging said annular shoulder, and wherein the periphery of said membrane is retained between said retaining member end and said annular shoulder, the said piston being longitudinally slidable within said tubular membrane retaining members.

References Cited

UNITED STATES PATENTS

| | | | |
|---|---|---|---|
| 464,146 | 12/1891 | Wright | 285—74X |
| 994,723 | 6/1911 | Davis | 285—74 |
| 2,204,392 | 6/1940 | Arm | 285—73 |
| 2,820,434 | 1/1958 | Otto | 92—48X |
| 3,182,684 | 5/1965 | Hutchison | 92—48X |
| 3,283,780 | 11/1966 | Sutton | 285—330X |
| 3,410,779 | 11/1968 | Whitehead | 92—97 |
| 3,443,827 | 5/1969 | Acker et al. | 285—330X |

MARTIN P. SCHWADRON, Primary Examiner

L. J. PAYNE, Assistant Examiner

U.S. Cl. X.R.

92—146; 285—74

Notice of Adverse Decisions in Interferences

In Interference No. 97,788 involving Patent No. 3,572,217, S. E. Corry, COUPLING DEVICE FOR FLUID PRESSURE TRANSMISSION CONDUITS, final judgment adverse to the patentee was rendered May 23, 1973, as to claims 1, 3 and 5.

[*Official Gazette October 23, 1973.*]